UNITED STATES PATENT OFFICE.

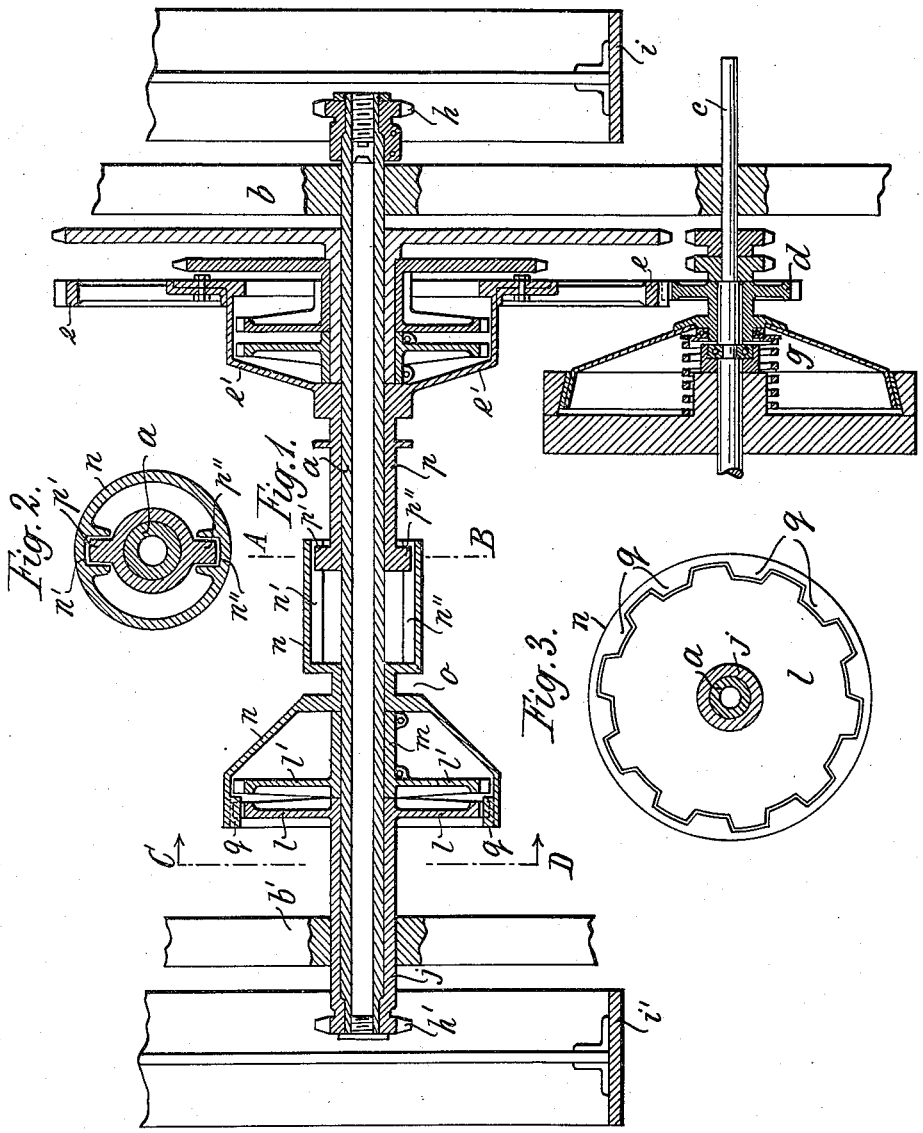

HENRY BAUCHET, OF RETHEL, FRANCE.

CLUTCH MECHANISM FOR MOTOR HAULAGE-VEHICLES.

1,153,014.	Specification of Letters Patent.	Patented Sept. 7, 1915.

Application filed January 9, 1914. Serial No. 811,199.

*To all whom it may concern:*

Be it known that I, HENRY BAUCHET, a citizen of the French Republic, and residing at Rethel, in the Department of Ardennes, France, have invented certain new and useful Improvements in Clutch Mechanism for Motor Haulage - Vehicles, of which the following is a specification.

The mechanism forming the subject matter of this invention is designed for use in tractors and other vehicles for agricultural purposes wherein, as is well known, the use of a differential gives unsatisfactory results by reason of the varying degree of adhesion and the want of firmness of the ground over which such vehicles have to travel.

The chief advantage of the improved mechanism according to the invention is to insure that when the vehicle is traveling in a straight line the maximum adhesion will be imparted to the vehicles fitted with driving mechanism according to the present invention, whereas the differential which is usually employed, causes a loss of the whole of the adhesion on the slightest slip of one of the driving wheels. The improved mechanism moreover facilitates the steering of the vehicle and allows of the latter turning within a very small radius.

The characteristic feature of this improved mechanism consists in replacing the differential by a clutch of any type (claw, friction and the like) which will allow of coupling the driving wheels together and with the motor, and also of driving one only of said driving wheels, as the case may require.

One embodiment of this invention is illustrated by way of example in the accompanying drawings in which:—

Figure 1 is a longitudinal section, Fig. 2 is a cross section on the line A—B of Fig. 1 and, Fig. 3 is a cross section on the line C—D of Fig. 1.

As shown, $a$ is a shaft mounted across the longitudinal beams $b$ and $b'$ of the chassis and it is driven from the motor shaft $c$ by means of a pinion $d$ and a change speed mechanism $e$. On the shaft $c$ there is also fixed a clutch $g$ for coupling it to the motor. On the two ends of the shaft $a$ there are fixed the chain pinions $h$ and $h'$ which drive the driving wheels $i$ and $i'$. The chain pinion $h$ is keyed directly on the shaft $a$, whereas the chain pinion $h'$ is fixed on a sleeve $j$ which is rotatable on the shaft $a$ and forms part of a claw plate $l$. Another claw plate $l'$ is adapted to be fixed to the shaft $a$ by means of the tightening sleeve $m$.

$n$ is a double coupling sleeve which can be slid along the shaft $a$ by means of a clutch fork or a crank pin engaging in the recess $o$. This coupling sleeve is actuated from the change speed gear box $e''$ by means of a sleeve $p$ fixed to the latter. This sleeve is provided at its end with two projections $p'$, $p''$ engaging in slots $n'$, $n''$ formed in the corresponding end of the coupling sleeve $n$ and thereby actuating this latter. The other end of the coupling sleeve is formed with claws $q$ engaging with the corresponding claws of the plates $l$ and $l'$.

From the foregoing it will be understood that when by means of a clutch fork (not shown), the coupling sleeve is caused to move in such a manner as to cause the claws to engage only the plate $l$, only the chain pinion $h'$ will be actuated and only the corresponding wheel $i'$ will be driven, and that during this period, the shaft $a$ with the pinion $h$ will not be driven. If, however, the coupling sleeve $n$ is moved to the right so as to engage only with the plate $l'$, then the pinion $h$ and the wheel $i$ will be driven, and the pinion $h'$ will not be driven. On engaging the claws of the coupling sleeve at one and the same time with both the plate $l$ and the plate $l'$, the two pinions $h$ and $h'$ will be actuated simultaneously.

While the vehicle is traveling in a straight line or when it is traveling in curves of large radius, both wheels will be driven. But one or the other wheel will be declutched or uncoupled in order to take curves of small radius, that is to say, only the wheel which is situated on the outside will act as a driving wheel, while the other wheel being loose, will revolve idly.

Having now described my invention, what I claim as new and desire to secure by Letters Patent is:—

1. Mechanism for the purpose described, comprising in combination a pair of road wheels, a motor driven shaft, an intermediate countershaft driven from the motor shaft, a sleeve on one end of the countershaft, power transmission means on said sleeve, and on the other end of the countershaft, a compound disk clutch on the countershaft, and means for actuating said clutch mechanism whereby both the sleeve and the countershaft will be coupled to the motor so that both road wheels will be simultaneously driven, or whereby either the sleeve or the counter-shaft will be driven and thus only one of the road wheels.

2. Mechanism for the purpose described comprising in combination, a pair of road wheels, a motor driven shaft, an intermediate countershaft, a change speed gear on the countershaft, a sleeve on one end of the countershaft, power transmission devices on one end of said sleeve and on the other end of the countershaft, a compound disk clutch mechanism on the countershaft, means whereby the change speed gear drives the clutch mechanism, two sets of engaging claws on the clutch mechanism, a toothed disk on the sleeve and a toothed disk on the countershaft in the proximity of the claws, and means for longitudinally sliding the clutch mechanism on the countershaft whereby both sets of claws and disks are brought into engagement to drive both road wheels simultaneously or either disk is brought into engagement with either set of claws to drive one road wheel.

In testimony whereof I have signed my name to this specification in the presence of two subscribing witnesses.

HENRY BAUCHET.

Witnesses:
P. RIEMART DU MIRAU,
H. BARDEL.

Copies of this patent may be obtained for five cents each, by addressing the "Commissioner of Patents, Washington, D. C."